Nov. 19, 1963  F. M. HAGMANN ETAL  3,111,237
SEAL FOR JAR CAPS
Filed July 25, 1960  2 Sheets-Sheet 1

INVENTORS
FOSTER M. HAGMANN
HAZEN B. GRAHAM
BY ROBERT B. MORRIS

Attorneys

Nov. 19, 1963   F. M. HAGMANN ETAL   3,111,237
SEAL FOR JAR CAPS
Filed July 25, 1960   2 Sheets-Sheet 2
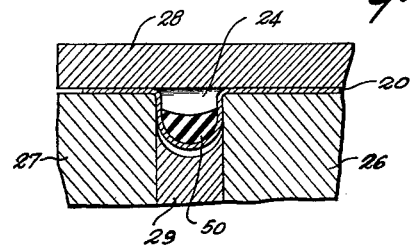
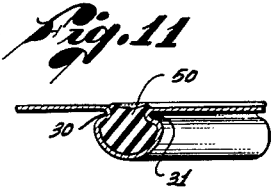
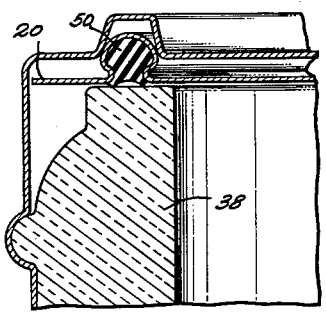
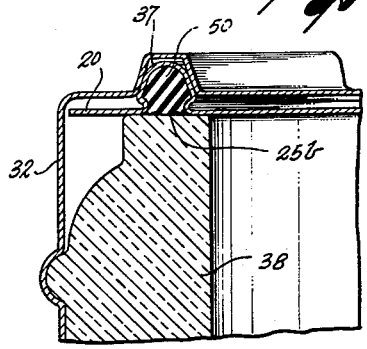
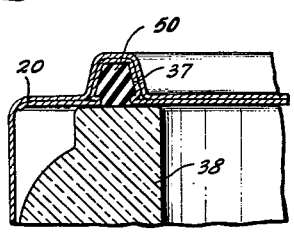
INVENTORS
FOSTER M. HAGMANN
HAZEN B. GRAHAM
BY ROBERT B. MORRIS
Attorneys United States Patent Office 3,111,237
Patented Nov. 19, 1963

3,111,237
SEAL FOR JAR CAPS
Foster M. Hagmann, 1001 3rd St., Santa Monica, Calif.; Hazen B. Graham, 746 Cory Drive, Inglewood 3, Calif.; and Robert B. Morris, 20616 Quedo Drive, Woodland Hills, Calif.
Filed July 25, 1960, Ser. No. 45,040
7 Claims. (Cl. 215—40)

This invention relates generally to seal means. More particularly, this invention relates to a seal retaining liner member for screw-type caps adapted for use with glass jars and the like, and particularly adapted to provide an inexpensive and efficient low pressure seal even when used with jars the tops of which are considerably out of flat or out of round.

In the past, it has been common to use a disk of cardboard or cork as a liner inside a jar cap to prevent the contents of the jar from contacting and thereby corroding or rusting the steel cap. There has frequently been used in conjunction with such a liner either a separate annular washer seal or a downward protrusion of the cap sealing part of the liner against the jar. Alternatively, various attempts have been made to use an O-ring seal.

When any of these arrangements are used, the effective sealing material thickness is limited to the amount of rise of the O-ring, the washer, or the liner material itself. In practice, this severely limits sealing tolerances for out of flat jars.

On the other hand, although it is desirable to have a large effective rise in order to provide efficient sealing even where the jar or bottle top is substantially out of flat, it is also desirable (from the point of view of accommodating jar tops which are out of round) to have an O-ring or other seal gland using the smallest diameter possible in order to more readily seat on such out of round jars. That is to say, if a perfectly annular O-ring is used in conjunction with a jar which, due to imperfect manufacture, is substantially out of round, then the smaller the cross sectional diameter of the ring, the greater the variation from annular roundness, which can be tolerated while still seating somewhere on the lip or top surface of the jar. On the other hand, where this top surface of the jar is out of flat from one side to the other with respect to the horizontal plane of the inside of the cap, it is desirable to have an O-ring, the cross section of which has as large a diameter as possible in order to accommodate the out of flat variations.

It is thus apparent that two seemingly contradictory requirements are imposed in order to obtain economical and efficient low pressure sealing of jars containing food stuffs and the likes, when the jars may be both out of flat and out of round.

It is thus an object of this invention to provide a seal for a jar or the like, which overcomes the above noted problems in the prior art.

It is a further object of this invention to provide a non-corrosive foil liner, which also serves as a seal retainer for a jar and which coacts with a tapered groove in the cap itself to provide take up to accommodate out of flat variations while still using a small diameter seal which also readily accommodates out of round variations.

It is a still further object of this invention to provide such a seal retaining liner, which affords a high unit area pressure by virtue of the small area of contact of the seal with the jar, thereby affording a good seal and still also affording a low break out torque so that the cap may be easily removed from the jar.

It is also an object of this invention to provide a corrosion resistant liner for a jar cap, which has a resilient seal member encased in a groove thereof and which encased seal coacts with a tapered groove in the jar cap to enhance sealing action against an out of flat surface even with a seal of small diameter.

Other objects, features, and advantages of the present invention will be more fully apparent to those skilled in the art from the following detailed description taken in connection with the accompanying drawings in which like reference characters refer to like parts throughout and wherein:

FIGURE 9 is a perspective view, partly broken away, showing the overall shape of the foil seal shown on a larger scale in the fragmentary view of FIGURE 4.

FIGURE 10 is a view similar to FIGURE 3, but showing an embodiment wherein the groove of the foil has a plastisol or other liquid seal material molded therein.

FIGURE 11 is an elevational view, partly in section, showing the seal of FIGURE 10 after the sealing material has been locked in the groove by the operation of the punch and die, shown in FIGURE 10.

FIGURE 12 is an elevational view, partly in section, of the metal jar cap and enclosed plastisol seal seated therein in position ready to be screwed down onto the top of a container.

FIGURE 13 is a view similar to FIGURE 12 showing the foil clad plastisol seal seated at a low point on the out of flat container top.

FIGURE 14 is a view similar to FIGURE 13, but showing the manner in which the seal seats on a high point on the out of flat container.

Figure 1:
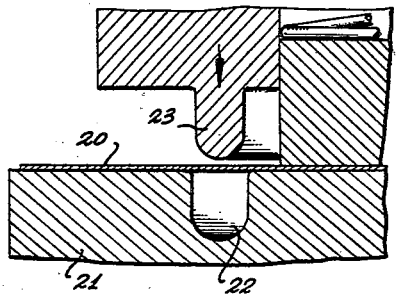
FIGURE 1 is a sectional view, partly broken away, showing a portion of a flat disk of thin metal foil positioned in a punch and die arrangement prior to the punching of an annular peripheral groove in the disk.

Turning now to the drawings, there will be seen in FIGURES 1 and 9 a metal foil disk 20 from which the seal retaining liner is fabricated. In a preferred embodiment, the disk 20 was a foil of semi-hard aluminum having a thickness of 0.003". However, it will be understood that the other suitable corrosion resistant foil materials could alternatively be used.

Figure 2:
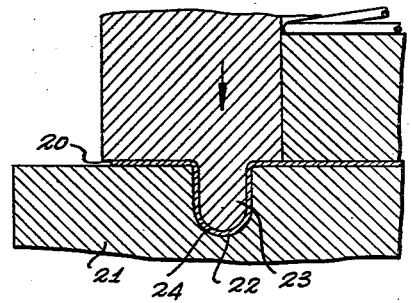
FIGURE 2 is a view similar to FIGURE 1, showing the punch in its descended position after it has stamped the groove.

As seen in FIGURE 1, the flat piece of thin metal foil forming the disk 20, is placed on a die 21 having an annular groove 22 formed therein. The punch member 23 is shaped and positioned to be received within the groove 22 when the punch descends and to thereby form a corresponding annular groove 24 peripherally around the edge of the disk 20, as may be seen in FIGURES 2 and 9.

In cross section, the annular groove 24 has vertical side walls terminating in a semi-circular bottom wall.

A pre-molded annular O-ring seal member 25 is placed in the annular groove 24. The O-ring 25 is preferably of the same radius as the radius of curvature of the bottom of groove 24 and the diameter of the O-ring is similarly equal to the width of groove 24. The O-ring 25 may be formed of any suitable resilient sealing material, such as a synthetic resinous plastic. In the above noted preferred illustrative embodiment, the width of the groove 24 and the diameter of O-ring 25 were both 0.045″.

Figure 3:
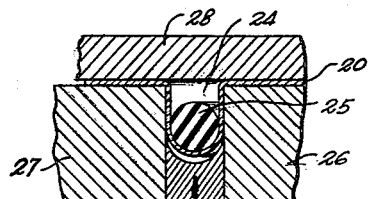
FIGURE 3 is a partial cross section of the groove after an annular sealing ring has been inserted therein and showing the grooved foil position in another punch and die arrangement for locking the seal ring into the groove.

As may be seen in FIGURE 3, the grooved foil 20 with O-ring 25 seated therein is then positioned on top of an inside die 26 and an outside die 27. The dies 26 and 27 have concentric annular configurations and are positioned adjacent the vertical side walls of groove 24 so as to be snugly received thereagainst. A bottom die 28 is positioned across the top surface of foil 20, thereby closing the top of groove 24.

A punch 29 is positioned for reciprocation between the dies 26 and 27. The punch 29 is of annular configuration and has an upper surface of a concave semi-circular shape mating with the shape of the bottom of the wall of the groove 24, as best seen in FIGURE 3.

Figure 4:
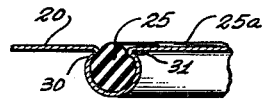
FIGURE 4 is an elevational view, partly in section, showing the cross section of the foil and seal after the seal has been locked in place by the operation of the punch shown in FIGURE 3.

The inside and outside dies hold the foil tightly against the bottom die so that when the punch is urged toward the bottom die, it forces the foil and the seal ahead of it into the configuration shown in FIGURE 4. In FIGURE 4, it will be noted that the originally vertical portions of the side walls of the groove 24 have been turned in near the top thereof as at 30 and 31 to thereby lock the seal 25 in place in the groove 24 by the inward curve of this portion of the foil. The seal, due to its resiliency, has as shown in FIGURE 4 risen above the sealing surface (i.e. above the upper surface of foil disk 20) after withdrawal of the die 28.

The seal retaining liner is thus seen in its completed form in FIGURES 4 and 9. From FIGURE 4, it will be noted that a portion 25a of the seal 25, which is now otherwise locked and encased entirely within the walls of groove 24, rises above the surface of the liner disk 20. However, if the diameter of the seal ring 25 is to be kept sufficiently small to accommodate containers which may be substantially out of round and to assure good sealing pressure, it is apparent that the height of the projection 25a above the surface of the disk 20 cannot itself be great enough to effectively seal and accommodate the magnitude of out of flat variations, which are commonly found in inexpensively manufactured jars and the like.

Figure 5:
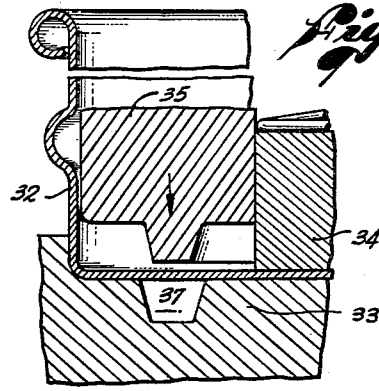
FIGURE 5 is a cross sectional view, partly broken away, showing a punch and die arrangement in open position for stamping a tapered groove peripherally of a threaded metal closure or cap.
Figure 6:
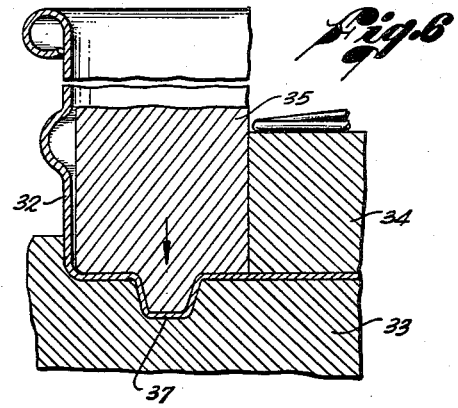
FIGURE 6 is a view similar to FIGURE 5 showing the punch in closed position after the groove has been stamped.

In order to provide a means for accommodating such significant out of flat variations, the threaded metal closure or jar cap 32 is provided with an annular tapered groove near the periphery thereof by the punch and die arrangement, shown in FIGURE 5. Thus, in FIGURE 5, the jar cap 32 is held between a die 33 having a groove formed therein and an inner die 34. A punch 35 having a groove-forming protrusion thereon is caused to descend in any convenient known manner and thereby stamp the groove 37. In FIGURE 6, the arrangement shown in FIGURE 5 is illustrated in the positions occupied by the parts after the punch has descended to form the tapered V-shaped groove 37.

Of course, it will be understood that groove 37 extends annularly completely around the periphery of the cap 32 near the edge of the top surface thereof. Furthermore, the interior diameter of the top surface of the cap 32 is substantially equal to the diameter of the liner disk 20 and the groove 37 is positioned to snugly receive the encased sealing ring 25 when liner 20 is positioned inside the top of cap 32, as seen in FIGURE 7.

As noted above, the groove 37 is generally V-shaped. In practice, in the above described illustrative embodiment, the walls of the groove have a 25° taper and the groove has a depth of 0.096″.

Figure 7:
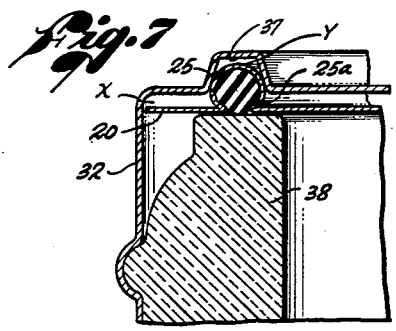
FIGURE 7 is an elevational view, partly in section, showing the foil encased sealing ring gland seated in the groove of the cap and in sealing engagement with the low side of the top of a container.

In FIGURE 7, the seal retaining liner 20 is shown snugly seated in the top of cap 32 with the encased seal 25 received within the groove 37. The position illustrated shows the maximum low side of the jar 38 which can be accommodated.

From FIGURE 7, it will be noted that the diameter of the encased seal is such with respect to the width of the groove 37 that the encased O-ring 25 normally seats at the mouth of the groove 37 leaving an enclosed space Y at the bottom of the groove. This in turn results in a space X between the seal 20 and the top of the cap 32.

Figure 8:
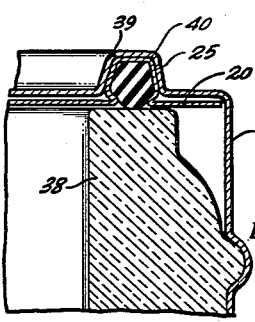
FIGURE 8 is a view similar to FIGURE 7 showing the arrangement in sealing engagement with the high side of an irregular container.

It will be noted that with this arrangement, the height of the projection 25a has added to it the width of the space X in determining the amount of travel available for sealing both flat and out of flat containers. That is to say, it may be considered that FIGURES 7 and 8 represent two opposite sides of the same container, FIGURE 7 representing the side in which the top of the jar is low and FIGURE 8 representing the side on which the top of the jar is high. It will be noted that, as the threaded cap 32 is screwed down, the high portion of the top of the jar shown in FIGURE 8 will force the encased seal gland 25 up into the space Y left in groove 37 and will deform the foil casing of the gland so as to conform with the shape of groove 37. On the other hand, as can be seen in FIGURE 7, the low side of the jar will merely seat snugly against the seal projection portion 25a. Of course, it will be understood that an effective low pressure seal can be obtained in any condition intermediate that shown in FIGURES 7 and 8.

In FIGURE 7, the foil and gland together may be considered to comprise a sealing volume, whereas the groove 37 in the cap 32, when this groove is empty, may be said to comprise a sealing void. In order to obtain effective sealing even at the maximum possible high side of the jar, it will be noted that the sealing volume of the foil and gland should be slightly less than or at most equal to the sealing void of the groove.

It will be noted in the showing of a high side seal in FIGURE 8 that the space Y has decreased to two small areas 39 and 40 at the lower corners of the groove. Space X, together with the reverse bends of the foil 20 and the resiliency of the seal gland has sufficient integrity to exert enough pressure on the low spots of the rim of the container to provide an efficient low pressure seal at those points.

In the above mentioned illustrative embodiment, using a 0.003″ foil, the total rise of projection 25a was approximately 20% of the diameter of the 0.045″ O-ring or 0.009″. The X space, on the other hand, including the thickness of the foil was approximately 0.020″. It will thus be apparent that the travel available for possible out of flat sealing accommodation has been increased from 0.009″ to 0.026″ by the present arrangement. This is an increase of nearly 3 to 1 for the same diameter of sealing gland. With the above noted illustrative dimensions, the jar with which the seal is used may be out of flat by as much as 0.012″ while at the same time being out of round by plus or minus 0.020″. Of course, it will be understood that the figures given are illustrative only and that other dimensions could be used and even greater improvements achieved.

In FIGURES 10, 11, 12, 13, and 14, there is illustrated an embodiment of the invention, wherein a sealing gland 50 is molded directly into the groove 24 in liner 20. In this embodiment, of course, the pre-molded gland or O-ring seal 25 is not used. The seal 50 may conveniently be molded in place from a plastisol material, partially filling the groove in the foil. In both embodiments, disk 20 may conveniently be semi-hard aluminum foil.

As seen in FIGURE 10, this partially filled groove is then placed inside the dies 26, 27, and 28 and by the action of punch 29 is formed to the shape shown in FIGURE 11, wherein the curved or turned in portions 30 and 31 hold the plastisol sealing gland in the groove in much the same manner as the sealing ring 25 is held in the embodiment shown in FIGURE 4.

In the embodiment of FIGURES 10 through 14, the plastisol is originally bonded in the groove. Inward motion of the side wall of the groove breaks the bond at thin edges thereof producing two protruding points at the outside of the groove while the remainder of the plastisol retains its characteristic curve assisted by the mass of plastisol which is still firmly bonded to the groove walls.

The same V groove 37 is used in the cap 32 in this embodiment of the invention, as was used in the earlier embodiment.

In FIGURE 13, there is shown a partial cross section of the closure and foil clad plastisol at a low point on the out of flat container. As the seal is forced down into the V groove, the resistant forces are transmitted to the center of the seal, creating a protrusion 25b at the top of the seal gland. This is sufficient to confine a low order of vacuum or pressure.

In FIGURE 12, the parts shown in FIGURE 13 are illustrated in the position they occupy immediately before the cap is screwed down. In the position of FIGURE 12, the closure foil encased plastisol seal are ready for application to the container. In FIGURE 13, on the other hand, the cap has been screwed down onto a low point of the jar 38.

By contrast, there is shown in FIGURE 14 a partial cross section of the parts shown in FIGURES 12 and 13, when these parts are sealed against a high point on the out of flat container. It will be noted that in FIGURE 14 the seal has been compressed beyond the point at which voids remain at the bottom of the groove so that there is complete contact between the foil encased seal and the rim of the container, as shown.

Thus, in both embodiments, there is provided an inexpensive yet efficient low pressure seal and liner for jar caps and the like which will tolerate greater degrees of both out of flat and out of round jar tops and which will afford a low break-out torque while still producing a good seal.

While a particular exemplary preferred embodiment of the invention has been described in detail above, it will be understood that modifications and variations therein may be effected without departing from the true spirit and scope of the novel concepts of the present invention as defined by the following claims.

We claim:

1. Closure means for an open mouth container having an externally threaded rim and a sealing surface on said rim comprising: a screw-type cap including a lid having a portion defining a continuous groove with a predetermined void in the interior of said cap, and an internally threaded skirt adapted for threaded engagement with said rim, the opening to said groove being opposite and in register with said sealing surface when said skirt is threadedly engaged with said rim; a flexible liner member snugly fitted within said cap and having a grooved section in registry with said groove; and a sealing ring of a resilient, deformable material partially encased within said grooved section of said liner member and yieldably maintained in a deformed condition thereby, the volume of said partially encased ring being substantially equal to, but no greater than, the predetermined void of said groove, said partially encased ring being initially disposed partially within said groove and being adapted to be deformed into and confined within said groove during threaded engagement of said skirt with said rim.

2. Container closure means comprising: a cap having a major surface shaped and adapted to sealingly seat on a wall of the container to be sealed, said cap having a continuous groove in its major surface opening opposite said wall when said cap is positioned on said container, the side walls of said groove tapering inwardly toward each other from top to bottom; means on said cap for removably securing it on said container; a foil liner fitted inside said cap; and a sealing gland of resilient, deformable material carried by said liner with a first portion locked and encased within a liner groove and a second portion initially projecting therefrom, said gland being disposed initially with its first portion proximate and in register with the groove in said cap and adapted to be received in a deformed state and confined entirely within said last mentioned groove.

3. Container closure means for an open mouth container having an externally threaded rim and a sealing surface on said rim, comprising: a screw-type cap including a generally flat lid having a marginal edge portion defining an annular groove with a predetermined void in the interior of said cap, the walls of said groove tapering inwardly toward one another from top to bottom at approximately 25° angles, and an internally threaded skirt adapted for threaded engagement with said rim, the opening to said groove being opposite and in register with said sealing surface when said skirt is threadedly engaged with said rim; a flexible liner snugly fitted within said cap; and an O-ring sealing member of a resilient, deformable material locked and partially encased within a grooved section of said liner member, the diameter in cross section of said partially encased member initially being greater than the minimum width in cross section of said groove and the volume of said partially encased member being substantially equal to but no greater than the predetermined void of said groove, said partially encased member initially being disposed proximate and in register with said groove and being adapted to be deformed into said groove during threaded engagement of said skirt with said rim.

4. Closure means for an open mouth container having a rim and an annular upwardly facing sealing surface on said rim, comprising:
    a cap having a major surface with an annular downwardly facing groove therein;
    means on said cap and rim for removably securing said cap to said container, the opening of said groove being in registry with said sealing surface when said means secure said cap to said container;
    a generally flat foil liner shaped to fit snugly inside said cap and having a grooved section in registry with said groove;
    a sealing ring formed of a resilient, deformable, and substantially incompressible material locked and partially encased within the grooved section of said liner and yieldably maintained in a deformed condition thereby, the encased portion of said ring being partially received within said groove and the non-encased portion of said ring being initially disposed out of said groove and spaced downwardly away from the major surface of said cap for contacting said sealing surface, said partially encased ring being adapted to be deformed against said sealing surface and moved upwardly into and confined within said groove when said means secure said cap to said container, so as to seal said container.

5. Closure means for an open mouth container having a rim and an annular upwardly facing sealing surface on said rim, comprising:
    a cap having a major surface with an annular downwardly facing groove therein, the radial width of said groove at its mouth being less than the radial width of said sealing surface;
    means on said cap and rim for removably securing said cap to said container, the opening of said groove being in registry with said sealing surface when said means secure said cap to said container;
    a generally flat liner formed of a thin workable material shaped to fit snugly inside said cap and having a grooved section in registry with said groove;
    a resilient, deformable sealing ring of generally circular cross section with a diameter greater than the minimum width of said groove over at least a portion of the depth thereof and having a volume substantially equal to the void of said groove, said ring being partially encased within the grooved section of said liner and yieldably maintained in the deformed condition thereby, the encased portion of said ring being initially received partially within said groove and the non-encased portion being initially disposed out of said groove and spaced downwardly away from the major surface of said cap for contacting said sealing surface, said partially encased ring being adapted to be deformed upwardly into and confined entirely within said groove when said means secure said cap to said container.

6. Closure means for an open mouth container having a rim and an annular upwardly facing sealing surface on said rim, comprising:
   a cap having a major surface with an annular downwardly facing groove therein, the radial width of said groove at its mouth being less than the radial width of said sealing surface;
   means on said cap and rim for removably securing said cap to said container, the opening of said groove being in registry with said sealing surface when said means secure said cap to said container;
   a generally flat liner formed of a thin flexible material shaped to fit inside said cap and having a grooved section in registry with said groove;
   and a resilient, deformable sealing ring normally having a generally circular cross section with a diameter greater than the minimum width of said groove over at least a portion of the depth thereof, said ring being carried and positioned by said liner with the upper portion of said ring initially received within said groove and the lower portion thereof projecting therefrom for contacting said sealing surface, said ring being adapted when said means secure said cap to said container to be deformed against said sealing surface and moved upwardly into and confined within said groove to seal said container.

7. The subject matter of claim 6 further characterized in that the portion of the liner which is immediately adjacent and carries said ring is receivable in said groove, and in that the volume of said ring together with the volume of said ring-carrying portion of said liner is substantially equal to the void of said groove.

References Cited in the file of this patent
UNITED STATES PATENTS

| | | |
|---|---|---|
| 976,659 | Keeran | Nov. 22, 1910 |
| 1,026,542 | Womelsdorf | May 14, 1912 |
| 1,318,112 | Savage | Oct. 7, 1919 |
| 2,528,506 | Foye | Nov. 7, 1950 |